COMPARING STORED AND EXTERNAL BINARY DIGITS

Filed March 29, 1960

2 Sheets-Sheet 1

INVENTOR
ABRAHAM FRANCK

BY Cushman, Darby & Cushman
ATTORNEYS

INVENTOR
ABRAHAM FRANCK
BY Cushman, Darby & Cushman
ATTORNEYS 3,195,108

COMPARING STORED AND EXTERNAL BINARY DIGITS

Abraham Franck, Richfield, Minn., assignor to Sperry Rand Corporation, New York, N.Y., a corporation of Delaware Filed Mar. 29, 1960, Ser. No. 18,334
38 Claims. (Cl. 340—146.2)

This invention relates to a process and apparatus for comparing at least one binary digit which is stored in a bistable memory element with an external binary digit. It also relates to the comparison of an external binary number, or "word" as it is frequently termed, with the contents of a binary memory with the comparison being made on the basis of one or more of various inequalities.

Previous methods and apparatus have been described for searching a memory, both destructively and non-destructively, for stored words which are equal in value to a word in an external register. Equality between the external word and any stored word is detected by a given type of output pulse from the memory, thereby indicating the memory location of the equal word. Generally, the entire memory is searched at one time, i.e., with one series of pulses. In the instant invention, a non-destructive bit-by-bit comparison is made between an external word and all the words in the memory. An additional bistable element, generally hereinafter referred to as the "comparator," which is external to the memory output, is provided for each word in the memory. As the bit-by-bit comparison progresses, the state of the comparator is switched or not depending on predetermined rules and arrangements as later described. Upon completion of the comparison, the final state of the comparator determines which of the words in the memory met the predetermined conditions of inequality.

Basically, the invention involves the comparison of the numerical value of a stored binary digit with the numerical value of an external binary digit. This is accomplished by employing two magnetic cores the first of which stores the internal binary digits and the other of which is employed to sense the state of the first core. The first core magnetically biases the magnetization of the second core from a given initial direction in accordance with the instant state of the first core. Coupled to the second core by a conductor which has its longitudinal physical axis preferably substantially perpendicular to the remanent magnetization axis of the first core, is a binary biasing field which represents the instant value of the external binary digit. This biasing field increases or decreases the total bias on the second core magnetization in accordance with the instant binary value of the biasing field and the instant state of the first core. In addition, there is applied to the second core during the existence of the biasing field, a drive field which causes a reversible magnetization change in the second core of one polarity or another, or of neither of such polarities, in accordance with the instant state of the first core and the instant binary value of the biasing field. These reversible magnetization changes may be assigned to represent equality and inequality between the external and internal binary digits.

It is therefore an object of this invention to provide a new and improved process for operating a two core bistable magnetic element to determine whether the binary content stored therein is equal or unequal to an external binary digit.

Another object of this invention is the provision of improved apparatus for determining equality and inequality between a binary digit stored in a bistable element with an external binary digit as represented by a binary biasing field.

Still another object of this invention is to provide a memory array with means for searching therein for stored words which are at least unequal in numerical value to an external word.

Another object of this invention is to provide apparatus as in the last prior object which can be searched bit-by-bit for inequality between words stored therein and an external word.

Yet another object of this invention in conjunction with the preceding object is the provision of means for searching a given bit of each word in the memory simultaneously.

Still other objects of this invention will become apparent to those of ordinary skill in the art by reference to the following detailed description of the exemplary embodiments of the apparatus and to the appended claims. The various features of the exemplary embodiments according to the invention may be best understood with reference to the accompanying drawings, wherein:

Figures 1, 2:
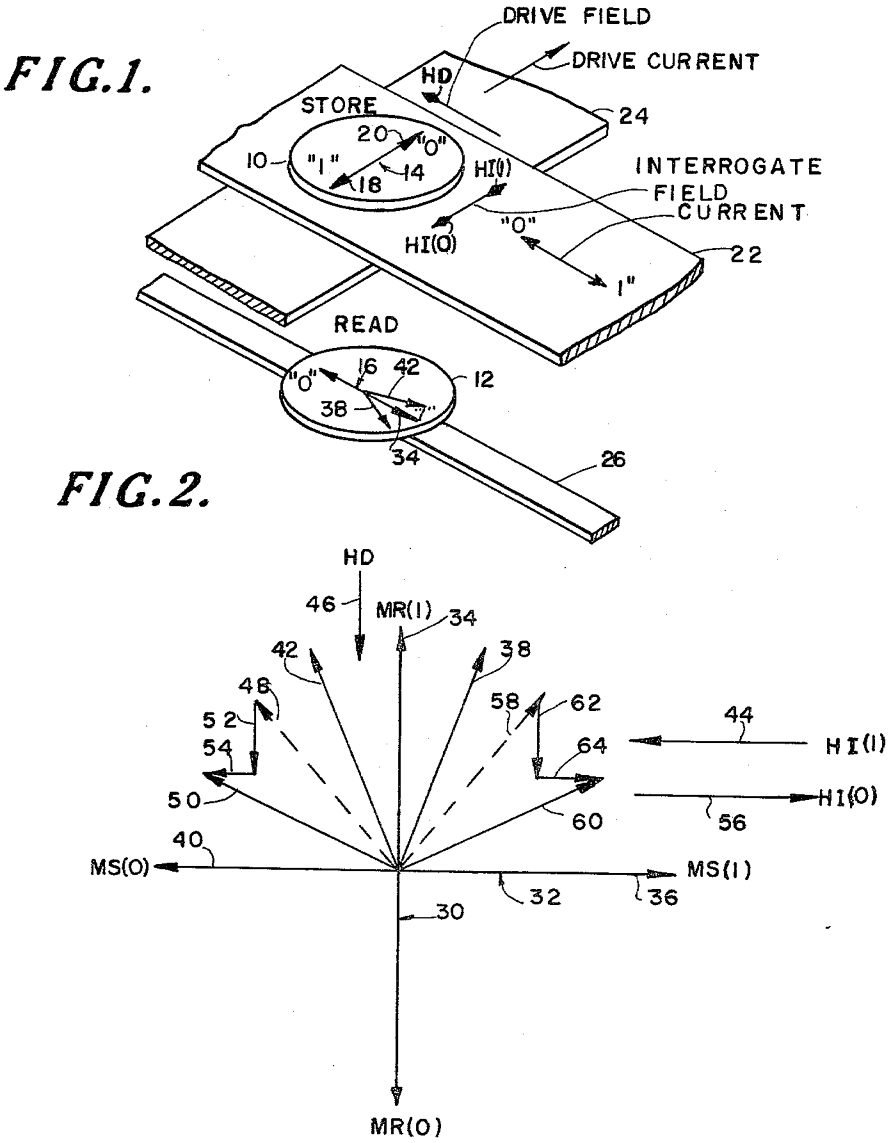
FIGURE 1 is an exploded view of a basic memory element usable in this invention.
FIGURE 2 illustrates exemplary magnetic vector relationships resulting from operating the element of FIGURE 1 in accordance with this invention.

The description proceeds with reference to "thin magnetic films." This phrase, as is now well known in the art, generally refers to small planar films of magnetic material which usually, and preferably, herein, have uniaxial anisotrophy, i.e., a single "easy" axis of magnetization along which the remanent magnetization lies in either of opposite directions, indicating the two stable states of the film, plus a single "hard" axis transverse to the easy axis. "Thin" magnetic films are generally considered to be in the 1–10,000 A. thickness range, and herein they preferably are of single domain thickness.

Magnetic films because of their magnetic characteristics are "ferromagnetic," and herein this includes the classification known as "ferrimagnetic," the materials of which have some relatively short antiparallel magnetic spins, to the degree that those materials possess the necessary characteristics for operating in accordance with this invention. Preferably, the magnetic films used with this invention are such as can be obtained in accordance with the Rubens patent, No. 2,900,282, i.e., vacuum evaporated and condensed 81:19 nickel iron films.

Such films, as well as many other types of magnetic materials, for example ferrite toroids and tape cores, can have their magnetization biased by the application of an external field. That is, the magnetization thereof can be rotated away from its easy axis by a field applied transversely of that easy axis. If too great a transverse field is applied, without any longitudinal field (one along the easy axis) being present at the same time, when the transverse field is released, the film may be demagnetized to the degree of having negligible remanence along its easy axis. However, if the transverse field is less than that which will cause demagnetization, the magnetization of the film will rotate a number of degrees generally proportional to the strength of the transverse field, and will rotate back to the easy axis upon release of the transverse field. If a longitudinal field is applied in conjunction with the transverse field, and the conjoint effect of the fields is great enough, the magnetization of the film will rotate past what may be termed a "reversible limit" or an "irreversible threshold" and into alignment with the easy axis in the opposite direction, i.e., it switches. However, when the longitudinal plus transverse field, or the latter alone, is insufficient to rotate the magnetization to that threshold, then the rotation is said to be "reversible" since it automatically returns to its prior position upon release of the applied field or fields. The onset of at least partial irreversibility (the reversible limit) occurs at a rotation angle $\theta_{max}$. which may be in the range 30°–45°, according to many different factors, some of which are still unknown, though generally the higher the ratio of $H_C/H_K$ the higher $\theta_{max}$. No limitation to that range is intended however, since apparent $\theta_{max}$ may range from 0° to about 90° in different films.

Generally speaking, this invention can employ any ferromagnetic material which can be reversibly magnetically biased, though thin films are the preferred example.

The copending application of Pohm et al., Serial No. 691,902, filed October 23, 1957, now Patent No. 3,015,-807, describes a thin magnetic film element and operation thereof, which may be the basic memory element in another copending application by Pohm et al., Serial No. 292 filed January 4, 1960, as well as in the instant invention. Briefly, the film element may consist of two bistable thin magnetic film type cores, a storage film and a readout film, each having an easy axis of magnetization and a hard axis of magnetization perpendicular thereto in the plane of the film. The films are physically positioned so that the easy axes are transverse to each other, so that the remanent magnetization field of the storage film is a transverse biasing field to the readout film. The state of the storage film can then be detected without destroying the information stored therein by sensing whether or not the readout film rotationally switches upon application of an interrogate field as fully described in the above mentioned Pohm et al. application, Serial No. 691,902.

The other above mentioned copending application of Pohm et al., Serial No. 292 teaches the use of a multiplicity of the such magnetic film elements, with their associated windings, as memory elements in a memory array for purposes of searching the memory for equality between an external word and the words in the memory array.

FIGURE 1 of the instant application shows a single memory element, as described hereinabove, with associated windings. Film 10 is the storage film with its easy axis depicted by line 14 and film 12 is the readout film with its easy axis shown by line 16. When the storage film is in the "1" state, arbitrarily selected as shown by arrowhead 18, it provides a transverse field to the readout film in one direction. When the storage film is in the "0" state, as shown by arrowhead 20, there results a transverse field in the opposite direction for the readout film. Such transverse fields provide a bias field to cause the magnetization vector of the readout film to rotate to a position away from a given direction parallel to its easy axis, the direction of rotation being dependent on the direction of the transverse field and the original state of the readout film.

FIGURE 2 shows the vector relationships described above. Line 30 is the easy axis of magnetization of the readout film whereas line 32 is its hard axis. The films are originally oriented such that their easy axes are mutually perpendicular, as stated hereinabove; hence lines 32 and 30 also designate the easy and hard axes respectively of the storage film 10. Assume that the readout film is originally in the "1" state, as shown by vector 34 labelled MR(1). If the storage film is originally in the "1" state, as arbitrarily represented by vector 36 labelled MS(1), it will bias the readout film to cause its magnetization vector to reversibly rotate clockwise to an angular position such as shown by vector 38. If the storage film is originally in the "0" state, as arbitarily represented by vector 40 labelled MS(0), it will reversibly bias the readout core counterclockwise to an angular position such as shown by vector 42.

With reference again to FIGURE 1, conductor 22, preferably of a printed circuit type, carries the interrogate current. The direction of current through that conductor depends on whether a search is being made for a "1" or a "0". As will be explained in detail herein below, conductor 22 is physically oriented such that the magnetic field produced by the interrogate current transversely biases the magnetization vector of the readout film and causes it either to reversibly rotate further away from its easy axis or to rotate back to a position substantially in alignment with its easy axis. Conductor 24, also preferably of a printed circuit type, carries the drive current, and is oriented so that the magnetic field produced by its current will be parallel to the easy axis of the readout film in the plane of that film, and preferably always antiparallel to the initial direction of remanent magnetization of the readout film as unbiased, i.e., in direct opposition to MR(1). Depending on the effect of the interrogate field on the readout core, the magnetic field created by the drive current will cause either still further, preferably reversible, rotation of the magnetization vector of the readout film or negligible rotation thereof.

Conductor 26 is the sense or output line, the function of which is well known in the art. Any change in the magnetic field which couples the output line along its magnetic axis induces a voltage therein. The only field which substantially couples output line 26 is the field from readout film 12. For reasons which will become apparent subsequently, the output line is preferably physically oriented so that its magnetic axis is parallel to the easy axis of storage film 10, i.e., perpendicular to the easy axis of readout film 12.

Reference to FIGURE 2 will aid in understanding the details of the matter discussed immediately above. Assume storage film 10 is in the arbitrarily designated "1" state so that vector 38 is the resultant biased magnetization vector of readout film 12. If a search is being made for a "1," conductor 22 will carry current in a direction which will produce a biasing or interrogate field as shown by arrow 44, labelled HI(1). The magnitude of the interrogate field must be such as to cause vector 38 to rotate counterclockwise to a position substantially in alignment with easy axis 30. Subsequent application of the drive current to conductor 24 will produce a drive field as shown by arrow 46 labelled HD. Since the drive field is parallel to the easy axis of the readout film, it will cause some small magnetization change along the easy axis of the readout film (assuming, as is the preferable case, that the drive field is not of sufficient magnitude to cause "wall motion" switching of the readout film), but negligible rotation of the magnetization vector thereof. Therefore, with the output line magnetic axis being perpendicular to that change, no signal will be induced in the output line.

Assume that originally the storage film had been in the arbitrarily designated "0" state, so that vector 42 depicts the biased magnetization of the readout film. In this case, the interrogate field shown by arrow 44 will cause counterclockwise rotation of vector 42 to a position shown by dotted line vector 48. Application of the drive current to produce the drive field will now cause further counterclockwise, preferably reversible, rotation of vector 48 to a new position, as for example that of vector 50. The magnitude and direction of the signal induced in the output line by the latter rotation will be proportional to the magnetic field change along the magnetic axis of the output line. The vectorial difference between vector 48 and vector 50 is shown by its two components, vectors 52 and 54. Since the magnetic axis of the output line is parallel to the easy axis of the storage film, it can be considered coincident with line 32. Therefore, the signal induced in the output line will be proportional to vector 54.

Continuing with the discussion of the various possible conditions that could exist, assume the storage film is in the "1" state but this time search is for a "0." The biasing or interrogate field HI(0) shown by arrow 56 will cause vector 38 to reversibly rotate clockwise to a new position such as shown by dotted line vector 58. Subsequent application of the drive field HD will cause still further rotation (again preferably reversible) to a new position, for example as shown by vector 60. The latter rotational change field is shown by its vector components 62 and 64, with the signal induced in the output line being proportional to vector 64. Note that although vectors 54 and 64 may be of equal magnitude, they are of opposite directions. Therefore, the polarity of the voltage induced in the output line indicates whether a "1" was originally stored and a "0" was searched for or a "0" was originally stored and a "1" was sought.

The final possibility under the arbitrary binary conditions stated, is that the storage film is originally in the "0" state and a "0" is sought. The effect of the biasing field HI(0), arrow 56, on vector 42 is to cause it to rotate back to a position substantially in alignment with the easy axis 34 of the readout film. Application of field HD will cause negligible rotation of the magnetization vector of the readout film thereby inducing a negligible signal in the output line.

Briefly reviewing, it has been shown that a signal of one polarity will occur when the memory element contains a "1" while being searched for a "0," whereas an opposite polarity signal will occur upon the search for a "1" when the memory element contains a "0." Additionally, no signal occurs when the searched for information and the stored information are equal. Of course, by reversing the arbitrary binary designations for the HI field for example, the opposite results may be obtained for an equality type mode of operation.

A few comments relating to the description to this point are now interjected.

First, it is assumed that any well known means (not shown) is used to originally store and modify the information in the storage film.

Secondly, it is obvious that many of the vectors and arrows of FIGURE 2 could be interchanged, the only restriction being, for an inequality operation mode, that opposite signals occur when inequality exists and that no signal occurs when there is equality.

Thirdly, though the readout film is preferably bistable, strictly speaking it need not be, as long as means is provided to effect an initial magnetization which is in a given direction perpendicular to the easy axis of the storage film and which is biasable by the remanent magnetization thereof.

Figure 3:
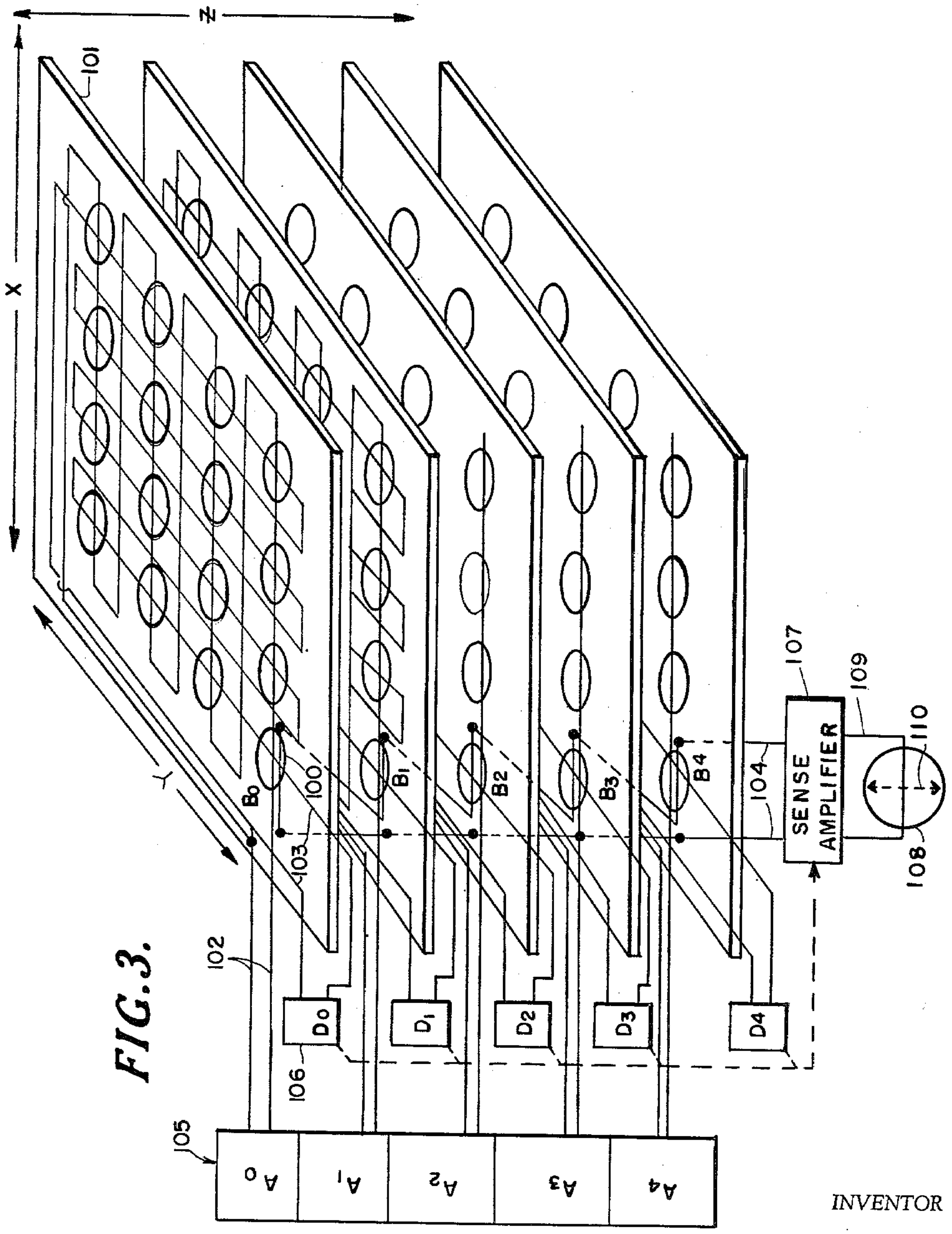
FIGURE 3 is an exemplary embodiment of search memory apparatus constructed in accordance with this invention.

Fourthly, FIGURE 2 exemplifies the operation such that rotation of the magnetization vector of the readout film is restricted to a single quadrant during any given search time. This is preferred to insure that the magnetization vector returns to its biased position, vector 38 or 42, upon removal of the interrogate and drive fields, i.e., that the reversible rotation limit $\theta_{max.}$ is not exceeded, it being understood that vectors 50 and 60 preferably result at an angle less than $\theta_{max.}$ regardless of the value of $\theta_{max.}$ However, it is possible to allow the readout film magnetization to exceed $\theta_{max.}$ and be rotationally switched to its opposite state by the combined effects of the interrogate and drive fields, as long as a means is provided to reposition the readout film magnetization to its original state before a subsequent search is made. Such means may effect a subsequent opposite polarity drive current pulse to cause reswitching, for example as shown in FIGURE 3 of said Pohm et al. application, Serial No. 691,902, now Patent No. 3,015,807. It can be shown that if complete switching were used, there would still be a difference in polarity in the induced signal voltages to distinguish the inequalities, but they would be of polarity opposite to those above described as long as the drive field remained in the same direction.

From the foregoing descriptive material it can now be seen that if a given word were stored in a memory device comprised of a multiplicity of the described memory elements with each element representing a given bit in the word, that word can be compared bit-by-bit to an external word by making the direction of the interrogate field HI dependent on the state ("1" or "0") of the corresponding bit in the external word.

FIGURE 3 shows an exemplary three-dimensional memory array incorporating this invention. For clarity each memory element consisting of two films, as shown in the enlarged view of FIGURE 1, is represented by a single unit 100. As is well known in the art, the film elements may be deposited on a suitable substrate 101, each substrate with the films and conductors deposited thereon being hereinafter referred to as a plane. The films are arranged on each plane symmetrically in the "X" and "Y" directions in a 4 x 4 array to give a total of 16 films per plane while five planes are stacked in the "Z" direction. All films in a single plane represent a given bit whereas all the films in a common column in the "Z" direction represent all the bits of a single word. The result is that 16 words of five bits each can be stored in the array of FIGURE 3. The interrogate line is represented by conductor 102, the drive line is represented by conductor 103, and the output line is represented by conductor 104. Each of the planes has as interrogate line, like line 102, coupling all the films in the plane. Also, each plane has a drive line coupling all the films in the plane, and each column of films has its own output line coupling all the films in that column. For clarity, means for writing information into the memory array are not shown although it is assumed that normally in a memory apparatus such means are provided. Each interrogate line is connected to a single bit in the external register 105. An interrogate generator, to provide current for the interrogate line, is an integral part of the external register. A separate drive current generator 106, one for each plane, provides the required drive current. The output line 104 serves as an input to sense amplifier 107, which is preferably gated on in coincidence with any one of the drive current generators, as shown by the dotted line. The output from that amplifier is coupled to comparator 108 via conductor 109. The comparator can be any suitable bistable device such as a conventional flip-flop, magnetic core, thin magnetic film, or other. For descriptive purposes, a magnetic film is used herein, no limitation thereto intended. The thin magnetic film is similar to storage film 10 in FIGURE 1 with the direction of magnetization along its easy axis indicating its state. The two possible magnetization states of the film may be referred to as the up or arbitrarily designated positive direction of remanent magnetization (positive remanence) and the down or negative direction thereof (negative remanence), symbolically, + and −, respectively, as shown by the arrowheads on dotted line vector 110. Since conductor 109 is physically oriented orthogonal to the easy axis, the magnetic field produced by current through that conductor will parallel the easy axis in the plane of the film. Since the signal induced in the output line 104 may be of either polarity, as described previously, the output of the sense amplifier may be of either polarity so the direction of the magnetic field produced by current through conductor 109 will depend on the polarity of the sense line signal. Therefore, in relation to their effect on the comparator, the opposite polarity output line signals can likewise be symbolically shown as vectors + and −. Arbitrarily it can be stated that if the external register bit contains a "1" and its corresponding memory bit contains a "0," a first polarity signal represented by + will result on the output line upon application of the drive current. If the contents of the two bits are reversed, a second plurality output line signal represented by − will result. If the contents are equal, no signal results.

Table 1 below shows the initial and final state of the comparator, depending on the inequality used as comparison between the external register word and the word in memory. For example, if searching for a memory word that is greater than or equal to the external word, ≧, the comparator must initially be set to the + state. If following the bit-by-bit comparison the comparator is in the − state, the inequality is indicated. The final state of the comparator can subsequently be determined by any convenient reading process.

*Table 1*

| Basis for comparison | ≧ | < | ≦ | > |
|---|---|---|---|---|
| Initial state of comparator | + | + | − | − |
| Final state of comparator | − | + | + | − |

The operation of this invention can best be described by a sample problem in conjunction with the exemplary embodiment shown in FIGURE 3. Assume the external register 105 contains the binary word 0 1 0 1 0, decimal 10, in bits $A_4$–$A_0$ respectively, whereas the binary word contained in the memory elements $B_4$–$B_0$ respectively, is 0 0 0 0 1, decimal 1. Furthermore, assume the memory is to be searched for all words which are less than, <, the external word.

According to Table 1, second column, comparator 108 is initially set, by means not shown, to the + state. Then the $A_0$ stage of the external register is activated whereby the least significant bit therein causes current from its associated interrogate generator (not shown, but within register 105) to flow through interrogate line 102. The direction of current depends on the state of the bit, i.e., whether a "1" or "0." As previously explained, the interrogate field biases or rotates the magnetization vector of the readout film of element $B_0$. Next, drive generator $D_0$ is activated and current flows through drive line 103. Since the $B_0$ element stores a "1" whereas its corresponding bit, $A_0$, in the external register is a "0," a negative inequality signal is induced in output line 104. Since the comparator 108 had been initially set to the + state, the amplified output from sense amplifier 107 causes the comparator to switch to the − state. Subsequently the same steps are repeated by energizing, in sequence, register stage $A_1$ and drive $D_1$. Since element $B_1$ stores a "0" and $A_1$ contains a "1," a + signal is induced in output line 104. This causes comparator 108 to switch back from the − state to the + state. Since the bits in $B_2$ and $A_2$ are equal, no signal appears on output line 104 when they are compared so the comparator remains in the + state. The inequality between bits in $B_3$ and $A_3$ produces a + output signal on line 104 in the same manner as described above relative to bit 1. Since the comparator is in the + state, it is not affected by this signal. Lastly, there is inequality between the bits in $B_4$ and $A_4$ so the comparator remains in the same + state which means the requirement as shown in the second column of Table 1 is met, indicating that the internally stored memory word is less than the external word.

Assume, for another example, that the same basis for inequality exists, i.e., that the search is still for memory words less than the external word, but that the memory word is 0 1 0 1 1, decimal 11 with the external word remaining 0 1 0 1 0, decimal 10. The comparator is again initially set to the + state. Comparison of bit $B_0$ to bit $A_0$ in the manner above described results in a − output line signal which switches the comparator 108 to the − state. The sequential comparison of the remaining bits results in consecutive no signals, because of equality between the bits. The final − state in the comparator indicates that this word does not meet the inequality requirement selected.

It is to be understood, as above indicated, that a separate output line, amplifier and comparator may be provided for each column of elements in the embodiment shown in FIGURE 3, only one being shown for clarity. All the comparators are coincidentally set initially according to the preselected basis of inequality per Table 1. Since the interrogate and drive lines couple all the memory elements in one plane, one bit in all words are simultaneously compared to the corresponding bit in the external register. After the bit-by-bit comparison is terminated, only those comparators which are in the proper final state, as shown by Table 1, will indicate the presence of memory words meeting the basis for inequality.

In many instances, the sign of a binary word is indicated by the state of the leftmost bit in the word, while the absolute quantity is represented by the "reciprocal" or end-to-end inversion of the remaining bits in the word. For example, binary word 1 0 1 0 1 may be equivalent to decimal −10. The "1" in the leftmost bit signifies the minus sign and by inverting the remaining bits to 1 0 1 0, the absolute quantity of decimal 10 is determined.

Where this invention is used in conjunction with the above described notation, the arrangement must be such that comparison between sign bits of the memory word and the external word results in sense line signals of polarities reversed from those previously described. That is, if the sign bit of the external register contains a "0" while that of the memory word contains a "1," a + signal (rather than a − signal as previously indicated) will result in the output line upon comparison of those two bits. If the contents are reversed, i.e., a "1" in the external register sign bit and a "0" in the sign bit of the memory word, a − signal appears on the sense line. The signals resulting from comparison of the remaining bits in the words are as previously described. By following the sequential steps related hereinabove, it can be shown that if the external register contains a negative number all positive memory words will be indicated if the basis for comparison is "greater than" or "greater than or equal to," even though the absolute value is less than that of the external word.

Thus it is apparent that this invention successfully achieves the various objects and advantages herein set forth.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. Apparatus for comparing the numerical value of a stored binary digit and an external binary digit comprising a first magnetic core which has two stable magnetic states by which said stored binary digit is represented with said states being the result of the core magnetization being in either of two different directions along a remanent magnetization axis, a magnetically biasable second magnetic core whose magnetization is biased from a given direction in either of opposite manners in accordance with the instant state of the first core, means coupling to said second core a binary biasing field representative of the instant value of said external digit for increasing or decreasing the bias on the second core magnetization in accordance with the instant binary value of the biasing field and the instant state of the first core, and means applying to said second core during the existence of said biasing field a drive field for causing a reversible magnetization change in the second core of first or second opposite polarities or of substantially neither of such polarities in accordance with the instant state of the first core and the instant binary value of the biasing field to indicate equality and inequality between the instant values of the external and stored binary digits.

2. Apparatus as in claim 1 wherein the biasing field is coupled to the second core in a direction substantially parallel to the said axis of the first core and represents said external binary digit by its polarity, said drive field being applied substantially perpendicular to said first core axis.

3. Apparatus for comparing the numerical value of a stored binary digit and an external binary digit comprising a first magnetic core which has two stable magnetic states by which said stored binary digit is represented as a "1" or "0" respectively, said states being the result of the core magnetization being in either of two different positions along a remanent magnetization axis, a magnetically biasable second magnetic core whose magnetization is biased from a given direction in either of opposite manners in accordance with the instant state of the first core, means coupling to said second core a binary biasing field representative of the instant value of said external binary digit for (A) increasing the bias on the magnetization of the second core when (1) the biasing field is of a first binary value and said first core is in a first of its states, or when (2) the biasing field is of a second binary value and the first core is in a second state, and for (B) substantially reducing the biasing effect on the second core of the remanent magnetization of the first core when (1) the biasing field is of said second value and the first core is in its said first state, or when (2) the biasing field is of said first value and the first core is in its second state, and means applying to the second core during the existence of said biasing field a drive field for causing a reversible magnetization change in the second core of (C) one polarity when the first core is in said first state while said biasing field is of said first value, and of (D) an opposite polarity when the first core is in said second state while said biasing field is of said second value.

4. Apparatus as in claim 3 wherein the drive field applying means causes the said field to be substantially antiparallel to said given direction.

5. Apparatus as in claim 4 wherein the biasing field represents the value of the external binary digit by its polarity and is coupled to the second core in a direction substantially parallel to the said first core axis.

6. Apparatus for comparing the binary information stored in a bistable element with an external binary digit comprising as said element a first magnetic core which has two stable magnetic states in which the core magnetization may be in either of two different directions along a remanent magnetization axis for storing said binary information and a magnetically biasable second magnetic core whose magnetization is biased from a given direction in either of opposite manners in accordance with the instant state of the first core, means coupling to said element a binary biasing field representative of the instant value said external binary digit for (A) increasing the bias on the magnetization of the second core when (1) the biasing field is of a first binary sense and said first core is in a first of its states, or when (2) the biasing field is in a second binary sense and the first core is in a second state, and for (B) substantially reducing the biasing effect on the second core of the remanent magnetization of the first core when (1) the biasing field is of said second sense and the first core is in its said first state, or when (2) the biasing field is of said first sense and the first core is in its second state, and means applying during the existence of said biasing field a drive field substantially parallel to the said axis of the second core for causing a substantial reversible magnetization change in the second core of (C) one polarity when the first core is in said first state while said biasing field is of said first sense, and of (D) an opposite polarity when the first core is in said second state while said biasing field is in said second sense.

7. Apparatus as in claim 6 wherein the drive field applying means causes the said drive field to be substantially antiparallel to the said initial remanent magnetization of the second core.

8. Apparatus as in claim 6 wherein the biasing field is coupled to the second core in a direction substantially perpendicular to the said second core axis.

9. Apparatus for comparing the binary information stored in a bistable element with an external binary digit comprising as said element a first magnetic core which has two stable magnetic states in which the core magnetization may be in either of two different directions along a remanent magnetization axis for storing said binary information and a magnetically biasable second magnetic core whose magnetization is reversibly biased from a given direction in either of opposite manners in accordance with the instant state of the first core, means coupling to said element a binary biasing field representative of the instant value said external binary digit for (A) increasing the bias on the reversible magnetization of the second core when (1) the biasing field is of a first binary sense and said first core is in a first of its states, or when (2) the biasing field is in a second binary sense and the first core is in a second state, and for (B) substantially reducing the biasing effect on the second core of the ramanent magnetization of the first core when (1) the biasing field is of said second sense and the first core is in its said first state, or when (2) the biasing field is of said first sense and the first core is in its second state, and means for detecting the polarity of substantially only the said substantial magnetization changes.

10. Apparatus for comparing the binary information stored in a bistable element with an external binary digit comprising as said element a first magnetic core which has two stable magnetic states in which the core magnetization may be in either of two different directions along a remanent magnetization axis for storing said binary information and a magnetically biasable second magnetic core whose magnetization is biased from a given direction in either of opposite manners in accordance with the intsant state of the first core, means coupling to said element a binary biasing field representative of the instant value said external binary digit for (A) increasing the bias on the magnetization of the second core when (1) the biasing field is of a first binary sense and said first core is in a first of its states, or when (2) the biasing field is in a second binary sense and the first core is in a second state, and for (B) substantially reducing the biasing effect on the second core of the remanent magnetization of the first core when (1) the biasing field is of said second sense and the first core is in its said first state, or when (2) the biasing field is of said first sense and the first core is in its second state, and means applying during the existence of said biasing field a drive field substantially parallel to the said axis of the second core for causing a substantial reversible magnetization change in the second core of (C) one polarity when the first core is in said first state while said biasing field is of said first sense, and of (D) an opposite polarity when the first core is in said second state while said biasing field is in said second sense, any other magnetization change resulting in said second core due to said drive field when the first core is in said second state while the biasing field is in said first sense, or when the first core is in said first state while the biasing field is in said second sense, having a negligible component if any of either of said magnetization change polarities.

11. Apparatus as in claim 10 and further including an output line coupled to the said second core and physically oriented substantially perpendicular to the said axis of the first core for detecting said reversible magnetization changes and carrying due thereto, respectively, first and second polarity electrical signals and substantially no electrical signal.

12. Apparatus for comparing the binary information stored in a bistable magnetic element with an external binary digit comprising as said element first and second adjacent bistable magnetic cores having their respective initial remanent magnetizations parallel to respective magnetization axes oriented at an angle to each other for reversibly biasing the said initial magnetization of the second core in either of opposite manners in accordance with the binary information stored in the first core as represented by the instant one of two stable states of remanent magnetization of the first core, means coupling to said element a binary biasing field representative of the instant value said external binary digit for (A) increasing the bias on the magnetization of the second core when (1) the biasing field is of a first binary sense and said first core is in a first of its states, or when (2) the biasing field is in a second binary sense and the first core is in a second state, and for (B) substantially eliminating the biasing effect on the second core of the remanent magnetization of the first core when (1) the biasing field is of said second sense and the first core is in its said first state, or when (2) the biasing field is of said first sense and the first core is in its second state, and means applying during the existence of said biasing field a drive field substantially parallel to the said axis of the second core for causing a substantial reversible magnetization change in the second core of (C) one polarity when the first core is in said first state while said biasing field is of said first sense, and of (D) an opposite polarity when the first core is in said second state while said biasing field is in said second sense, any other magnetization change resulting in said second core due to said drive field when the first core is in said second state while the biasing field is in said first sense, or when the first core is in said first state while the biasing field is in said second sense, having a negligible component if any of either of said magnetization change polarities.

13. Apparatus as in claim 12 wherein said drive field is applied antiparallel to the said initial remanent magnetization of the second core.

14. Apparatus as in claim 12 wherein the biasing field represents said external binary digit by its polarity.

15. Apparatus as in claim 12 wherein the biasing field is coupled to the second core in a direction substantially perpendicular to the said second core axis.

16. Apparatus for comparing the binary information stored in a bistable magnetic element with an external binary digit comprising as said element first and second adjacent bistable magnetic cores having their respective initial remanent magnetizations parallel to respective magnetization axes oriented at an angle to each other for reversibly biasing the said initial magnetization of the second core in either of opposite manners in accordance with the binary information stored in the first core as represented by the instant one of two stable states of remanent magnetization of the first core, means coupling to said element a binary biasing field representative of the instant value said external binary digit for (A) increasing the bias on the magnetization of the second core when (1) the biasing field is of a first binary sense and said first core is in a first of its states, or when (2) the biasing field is in a second binary sense and the first core is in a second state, and for (B) substantially eliminating the biasing effect on the second core of the remanent magnetization of the first core when (1) the biasing field is of said second sense and the first core is in its said first state, or when (2) the biasing field is of said first sense and the first core is in its second state, and means applying during the existence of said biasing field a drive field substantially parallel to the said axis of the second core and substantially antiparallel to the said initial remanent magnetization of the second core for causing a substantial reversible magnetization change in the second core of (C) one polarity when the first core is in said first state while said biasing field is of said first sense to indicate that the stored binary information is unequal in one direction to the binary digit compared thereto, and of (D) an opposite polarity when the first core is in said second state while said biasing field is in said second sense to indicate that the stored binary information is unequal in an opposite direction to the binary digit compared thereto, any other magnetization change resulting in said second core due to said drive field when the first core is in said second state while the biasing field is in said first sense, or when the first core is in said first state while the biasing field is in said second sense, having a negligible component if any of either of said magnetization change polarities and indicating equality between the stored binary information and the binary digit compared thereto.

17. Apparatus as in claim 16 and further including an output line oriented to sense said substantial reversible magnetization changes and provide opposite polarity electrical output signals respectively, but to substantially ignore said any other magnetization change and provide no electrical output signal therefrom.

18. Apparatus for comparing the binary information stored in a bistable magnetic element with an external binary digit comprising as said element first and second adjacent bistable magnetic cores each of which has within itself a given magnetization axis parallel to which its remanent magnetization is positioned in the absence of any field externally coupled to that core, with the remanent magnetization of said second core being in a given direction along its said axis in the absence of any so coupled field, the magnetization of at least said second core being rotatable within that core away from and back to said given direction, said axes being oriented transversely of each other for causing reversible rotation of the remanent magnetization of the second core away from said given direction clockwise or counterclockwise in accordance with the binary information in the first core as represented by the instant one of the two stable remanent magnetization states thereof, means coupling to said element a binary field representative of the instant value of said external binary digit for (A) reversibly rotating the second core magnetization more in the same direction as rotated by the first core remanent magnetization (1) when the binary field is in a first binary sense and said first core is in a first of its said states, or (2) when the binary field is in a second binary sense and said first core is in a second of its said states, and for (B) rotating the second core magnetization substantially back to said given direction when (1) the binary field is in said second sense and the first core is in its first state, or when (2) the binary field is in said first sense and the first core is in its second state, and means applying to the second core during the existence of said binary field a drive field for causing further rotation of the second core magnetization to effect a reversible magnetization change in the second core of (C) one polarity when the first core is in said first state while the binary field is in said first sense, and of (D) an opposite polarity when the first core is in said second state while the binary field is in said second sense, any other magnetization change resulting in said second core due to said drive field when the first core is in said second state while the binary field is in said first sense, or when the first core is in said first state while the biasing field is in its second sense, having a negligible component if any of either of said magnetization change polarities.

19. Apparatus as in claim 18 wherein the said drive field is applied along the said axis of the second core.

20. Apparatus as in claim 19 wherein the drive field is applied substantially antiparallel to said given direction of remanent magnetization of the second core.

21. Apparatus as in claim 19 wherein the said binary field is coupled to the second core in a direction substantially perpendicular to the said second core axis and represents the value of said external binary digit by its polarity.

22. Apparatus as in claim 18 wherein said opposite polarity reversible magnetization changes occur in directions substantially parallel to the said axis of the first core and said any other magnetization is substantially parallel to the said axis of the second core when it occurs, and further including an output means oriented with its magnetic axis substantially parallel to the said axis of the first core for sensing of substantially only the said opposite polarity reversible magnetization changes.

23. Apparatus as in claim 18 wherein at least said second core is a ferromagnetic film.

24. Apparatus as in claim 23 wherein said film is of single domain thickness.

25. Apparatus as in claim 18 wherein each of said cores is a ferromagnetic film of single domain thickness with uniaxial anisotropy.

26. Apparatus for comparing the binary information stored in a bistable magnetic element with an external binary digit comprising as said element first and second adjacent bistable magnetic cores each of which has within itself a given magnetization axis parallel to which its remanent magnetization is positioned in the absence of any field externally coupled to that core with the remanent magnetization of said second core being in a given direction along its said axis in the absence of any so coupled field, the magnetization of at least said second core being rotatable within that core away from and back to said given direction, said axes being oriented transversely of each other for causing reversible rotation of the remanent magnetization of the second core away from said given direction clockwise or counterclockwise in accordance with the binary information in the first core as represented by the instant one of the two stable remanent magnetization states thereof, means coupling to said element a binary field representative of the instant value of said external binary digit for (A) reversibly rotating the second core magnetization more in the same direction as rotated by the first core remanent magnetization when (1) the binary field is in a first binary sense and said first core is in a first of its said states, or when (2) the binary field is in a second binary sense and said first core is in a second of its said states, and for (B) rotating the second core magnetization substantially back to said given direction when (1) the binary field is in said second sense and the first core is in its first state, or when (2) the binary field is in said first sense and the first core is in its second state, and means applying to the second core during the existence of said binary field a drive field substantially antiparallel to said given direction for causing further rotation of the second core magnetization in the same direction as aforesaid under (A) when (A1) or (A2) exist to effect a reversible magnetization change in the second core of (C) one polarity when the first core is in said first state while the binary field is in said first sense to indicate that the stored binary information is unequal in one direction to the binary digit compared thereto, and of (D) an opposite polarity when the first core is in said second state while the binary field is in said second sense to indicate that the stored information is unequal in an opposite direction to the binary digit compared thereto, any other magnetization change resulting in said second core due to said drive field when the first core is in said second state while the binary field is in said first sense, or when the first core is in said first state while the biasing field is in its second sense, having a negligible component if any of either of said magnetization change polarities and indicating equality between the stored binary information and the binary digit compared thereto.

27. Apparatus as in claim 26 wherein said opposite polarity reversible magnetization changes are in reference to directions substantially parallel to the said axis of the first core and said any other magnetization change is substantially parallel to the said axis of the second core when it occurs, and further including an output line oriented with its physical axis substantially parallel to the said magnetization axis of the second core for sensing the said opposite polarity reversible magnetization changes to effect opposite polarity electrical signals respectively and for substantially ignoring any said other magnetization change to provide substantially no electrical signal due thereto.

28. Apparatus as in claim 26 wherein the binary field is coupled to the second core substantially perpendicular to the said axis thereof and represents the external binary digit by its polarity.

29. Apparatus for comparing the numerical value of an internal binary digital number having respective digits stored in respective bistable magnetic elements to the numerical value of an external binary digital number comprising a different bistable element for each digit of said internal number, each of said elements including a first magnetic core which has two stable states by which the respective stored digit is represented with said states being the result of the core magnetization being in either of two different directions along a remanent magnetization axis and an associated magnetically biasable second magnetic core whose magnetization is biased from a given direction in either of two opposite manners in accordance with the instant state of the associated first core, a plurality of biasing means respectively for said elements sequentially coupling to the respective second cores a binary biasing field representative of the instant value of a respective one of the digits of the external binary number for increasing or decreasing the bias on the magnetization of each second core in accordance with the instant value of the biasing field coupled thereto and the instant state of the associated first core, a plurality of driving means respectively for said elements sequentially applying to each of the second cores while the respective biasing field is coupled thereto a drive field for causing sequential reversible magnetization changes respectively in the second cores of first or second opposite polarities or of substantially neither of such polarities in accordance with the instant state of the respectively associated first cores and the instant value of the respectively coupled biasing fields, and output means coupled to each of said second cores for producing first and second opposite polarity electrical signals and substantially no electrical signal respectively in response to said magnetization changes.

30. Apparatus as in claim 29 wherein said output means includes an output line coupled to all the second cores with its magnetic axis at least in the coupling areas being substantially parallel to the respectively associated first core axes.

31. Apparatus as in claim 29 wherein the drive fields are respectively applied to the second cores antiparallel to the said given direction thereof.

32. Apparatus as in claim 29 wherein each of the biasing means couples its field to the respective second core in a direction parallel to the said axis of the associated first core and represents the value of a respective digit of the external number by its polarity.

33. Apparatus as in claim 29 wherein the second core of each element is bistable and has a remanent magnetization axis which is oriented transversely of the said associated first core axis, said given direction of the second core being parallel to the said axis of the second core and representing one of the stable states thereof.

34. Apparatus as in claim 29 and further including switchable bistable means coupled to said output means for receiving said electrical signals, said bistable means being switched to a first stable state if not already therein in response to each successive first electrical signal when occurring and to a second stable state if not already therein in response to each successive second electrical signal when occurring but being incapable of being switched whenever substantially no electrical signal results from a magnetization change in the second core, equality and inequality between the said internal and external binary numbers being indicated by the state of said bistable means after all the biasing and drive fields have been applied in comparison to the state thereof before any such fields are applied.

35. Apparatus for comparing the numerical value of an internal binary digital having respective digits stored in respective bistable magnetic elements to the numerical value of an external binary digital number comprising a different bistable element for each digit of said internal number with each of said elements including first and second adjacently associated bistable cores with remanent magnetization axes transversely aligned so that the magnetization of the second core is rotated from a given direction parallel to its axis clockwise or counterclockwise in accordance with the associated first core state which represents a respective digit of said internal number, a plurality of interrogate generators respectively and sequentially coupling to the second cores, in directions substantially perpendicular to the respective said axis thereof and substantially parallel to the respective first core axes, binary fields representing by their respective polarities the instant values of respective digits of the external binary number for (A) reversibly rotating the magnetization of each second core more in the same direction as rotated by the associated first core magnetization when (1) the respective binary field has a first polarity and the associated first core is in a first remanent state, or when (2) the respective binary field has a second and opposite polarity and the associated first core is in a second remanent state, and for (B) rotating the magnetization of each second core substantially back to said given direction when (1) the respective binary field has said second polarity and the associated first core is in said first state, or when (2) the respective binary field has said first polarity and the associated first core is in its second state, a plurality of drive generators respectively and sequentially coupling to each of the second cores while the respective binary field is coupled thereto and in a direction parallel to the respective second core axis a drive field for causing a reversible magnetization change in the respective second core as referenced to the associated first core axis of (C) a first polarity when the associated first core is in said first state, while the respective binary field has said first polarity, or of (D) a second and opposite polarity when the associated first core is in said second state while the respective binary field has said second polarity, or of (E) substantially neither of such polarities when (1) the associated first core is in said second state while the respective binary field has said first polarity, or when (2) the associated first core is in said first state while the respective binary field has said second polarity, an output line serially coupling the second cores with its magnetic axis at least in the coupling areas being substantially parallel to the associated first core axis and respectively deriving in response to said (C), (D), (E) magnetization changes a first polarity electrical signal, a second and opposite polarity electrical signal, and substantially no signal, and a bistable device coupled to said output line and being switchable to a first state only in response to said first electrical signal and to a second state only in response to said second electrical signal, the arrangement being such that equality and/or inequality between the internal and external numbers is represented by the state of said bistable device after all said binary and drive fields have been applied compared to its state before such fields are applied.

36. Apparatus as in claim 35 wherein the drive fields are coupled to the respective second cores antiparallel to the said given direction thereof.

37. Apparatus as in claim 36 wherein the said before state of the bistable device is said first state thereof and the said after state of the device is said second state thereof if the internal number is greater than or equal to the external number but is said first state thereof if the internal number is less than the external number.

38. Apparatus as in claim 36 wherein the said before state of the bistable device is said second state thereof and the said after state of the device is said first state thereof if the internal number is less than or equal to the external number but is said second state if the internal number is greater than the external number.

References Cited by the Examiner

UNITED STATES PATENTS

| | | | |
|---|---|---|---|
| 2,691,156 | 10/54 | Saltz | 340—166 |
| 2,709,248 | 5/55 | Rosenberg | 340—166 |
| 2,905,931 | 9/59 | Lubkin | 340—146.2 |
| 2,973,506 | 2/61 | Newby | 340—146.1 |
| 2,973,508 | 2/61 | Chadurjian | 340—174 |
| 3,015,807 | 1/62 | Pohm et al. | 340—174 |
| 3,104,380 | 9/63 | Haibt | 340—146.2 |

FOREIGN PATENTS 1,190,683 10/59 France.

OTHER REFERENCES

Pp. 54S–55S, April 1959, "Coincident-Current Nondestructive Read-Out From Thin Magnetic Films," Lewis J. Oakland.

Pp. 55–57, June 5, 1959, "Using Thin Films in High-Speed Memories," Eric E. Bittman, Electronics.

MALCOLM A. MORRISON, *Primary Examiner.*

EVERETT R. REYNOLDS, *Examiner.*